US010443375B2

(12) United States Patent
Nguyen

(10) Patent No.: US 10,443,375 B2
(45) Date of Patent: Oct. 15, 2019

(54) ADJUSTABLE ACOUSTIC TRANSDUCERS FOR A DOWNHOLE TOOL

(71) Applicant: Halliburton Energy Services, Inc, Houston, TX (US)

(72) Inventor: Minh Dang Nguyen, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/520,901

(22) PCT Filed: Dec. 30, 2014

(86) PCT No.: PCT/US2014/072744
§ 371 (c)(1),
(2) Date: Apr. 21, 2017

(87) PCT Pub. No.: WO2016/108841
PCT Pub. Date: Jul. 7, 2016

(65) Prior Publication Data
US 2017/0350242 A1    Dec. 7, 2017

(51) Int. Cl.
*E21B 47/14* (2006.01)
*G01V 1/44* (2006.01)
(Continued)

(52) U.S. Cl.
CPC ............ *E21B 47/14* (2013.01); *E21B 47/124* (2013.01); *G01V 1/44* (2013.01); *G01V 1/46* (2013.01);
(Continued)

(58) Field of Classification Search
CPC ...... G01V 2001/526; G01V 1/44; G01V 1/46; G01V 1/50; G01V 1/52; G01V 1/526;
(Continued)

(56) References Cited

U.S. PATENT DOCUMENTS 3,136,381 A    6/1964   Anderson
3,346,068 A    10/1967  Woods et al.
(Continued)

FOREIGN PATENT DOCUMENTS

EP       0339746 A2     11/1989
WO       WO 2013/081608 A1    6/2013

OTHER PUBLICATIONS

International Search Report and the Written Opinion of the International Search Authority, or the Declaration, dated Sep. 14, 2015, PCT/US2014/072744, 15 pages, ISA/KR.
(Continued)

*Primary Examiner* — Franklin D Balseca
(74) *Attorney, Agent, or Firm* — Haynes and Boone, LLP

(57) ABSTRACT

Movable transducer designs used in downhole environments increase the efficiency of the transmitter and receivers, thereby obtaining improved logging data. In one embodiment, the transmitter/receivers are tilted/rotated to direct the strongest acoustic wave pressure to the critical path for increasing signal strength. In other embodiments, the transmitter/receiver may be extended outwardly toward the formation, or retracted inwardly from the formation. An adaptive algorithm is provided to rotate the transmitter/receiver to match the critical angle when the formation slowness changes. Also, a transmitter/receiver port may be designed to have a cone-shape that matches the impedance of the acoustic wave to the surrounding environment.

8 Claims, 7 Drawing Sheets

(51) Int. Cl.
*G01V 1/52* (2006.01)
*E21B 47/12* (2012.01)
*G01V 1/46* (2006.01)
*G01V 1/50* (2006.01)
*E21B 47/16* (2006.01)

(52) U.S. Cl.
CPC ............ *G01V 1/50* (2013.01); *G01V 1/52* (2013.01); *E21B 47/12* (2013.01); *E21B 47/16* (2013.01); *G01V 2001/526* (2013.01)

(58) Field of Classification Search
CPC ......... G01H 5/00; E21B 47/124; E21B 47/14; E21B 47/16; E21B 47/18; E21B 47/101
See application file for complete search history.

(56) References Cited

U.S. PATENT DOCUMENTS

| | | | |
|---|---|---|---|
| 3,426,865 A | 2/1969 | Louis | |
| 3,517,768 A | 6/1970 | Straus | |
| 4,293,934 A * | 10/1981 | Herolz | G01V 1/46 346/33 WL |
| 4,511,842 A | 4/1985 | Moran et al. | |
| 4,611,685 A * | 9/1986 | Curran | G10K 11/18 181/102 |
| 4,947,683 A * | 8/1990 | Minear | E21B 47/101 73/152.32 |
| 4,987,969 A | 1/1991 | Boyle et al. | |
| 5,544,127 A * | 8/1996 | Winkler | G01V 1/303 181/104 |
| 5,563,846 A | 10/1996 | Fillon et al. | |
| 5,987,991 A * | 11/1999 | Trantow | G01N 29/2418 73/624 |
| 6,098,017 A | 8/2000 | Brown et al. | |
| 6,836,218 B2 | 12/2004 | Frey et al. | |
| 6,998,844 B2 | 2/2006 | Omeragic et al. | |
| 7,202,670 B2 | 4/2007 | Omeragic et al. | |
| 7,239,145 B2 | 7/2007 | Homan et al. | |
| 8,194,497 B2 * | 6/2012 | Mickael | G01V 1/50 340/853.6 |
| 8,264,228 B2 | 9/2012 | Bittar et al. | |
| 8,408,335 B2 | 4/2013 | Rushton | |
| 2006/0233048 A1 | 10/2006 | Froelich et al. | |
| 2006/0254767 A1 * | 11/2006 | Pabon | G01V 1/52 166/254.2 |
| 2010/0271031 A1 | 10/2010 | Behnsen et al. | |
| 2011/0286307 A1 | 11/2011 | Wang | |
| 2012/0182831 A1 | 7/2012 | Cooper et al. | |
| 2012/0215107 A1 * | 8/2012 | Yamamoto | A61B 8/14 600/441 |
| 2014/0056101 A1 | 2/2014 | Vu et al. | |

OTHER PUBLICATIONS

Market, et al., "Multipole Sonic Logging in High-Angle Wells. Society of Petrophysicists and Well-Log Analysts," *SPWLA 50th Annual Logging Symposium*, The Woodlands, Texas, Jan. 21-24, 2009.

* cited by examiner ately to continually optimize the signal
ADJUSTABLE ACOUSTIC TRANSDUCERS FOR A DOWNHOLE TOOL The present application is a U.S. National Stage patent application of International Patent Application No. PCT/US2014/072744, filed on Dec. 30, 2014, the benefit of which is claimed and the disclosure of which is incorporated herein by reference in its entirety.

FIELD OF THE DISCLOSURE

The present disclosure generally relates to downhole sensors and, more particularly, to adjustable acoustic transducers integrated into downhole tools to provide increased signal strength.

BACKGROUND

Acoustic measurement systems used in logging while drilling ("LWD"), as well as wireline logging applications, have been found to be effective in obtaining various formation property data. During operation, acoustic waves are fired from the transmitters located on the tool. The acoustic responses are then captured by an array of receivers spaced apart along the tool body. The recorded acoustic responses will be processed to determine the compressional and shear slowness of the formation.

In slow formations, where the shear wave velocity is slower than the sound velocity in the mud, there is no critical shear wave from the formation. To resolve this issue, specially excited borehole waves, such as dipole or quadrupole modes, need to be used. These working modes will asymptote to formation shear at low frequency. However, in these modes, the energy of the transferred acoustic wave reduces by one order compared to the monopole. Therefore, the transmitter must provide enough energy for the waves to propagate through the formation. One approach is to increase the strength of the acoustic transmitter or the sensitivity of the receivers. Although this approach is effective, this will increase the tool mode as well as the noise in the recorded data logs. Moreover, this increase in the tool mode and noise is much more challenging in LWD where the tool body is thick and rigid.

DESCRIPTION OF ILLUSTRATIVE EMBODIMENTS

Figure 1:
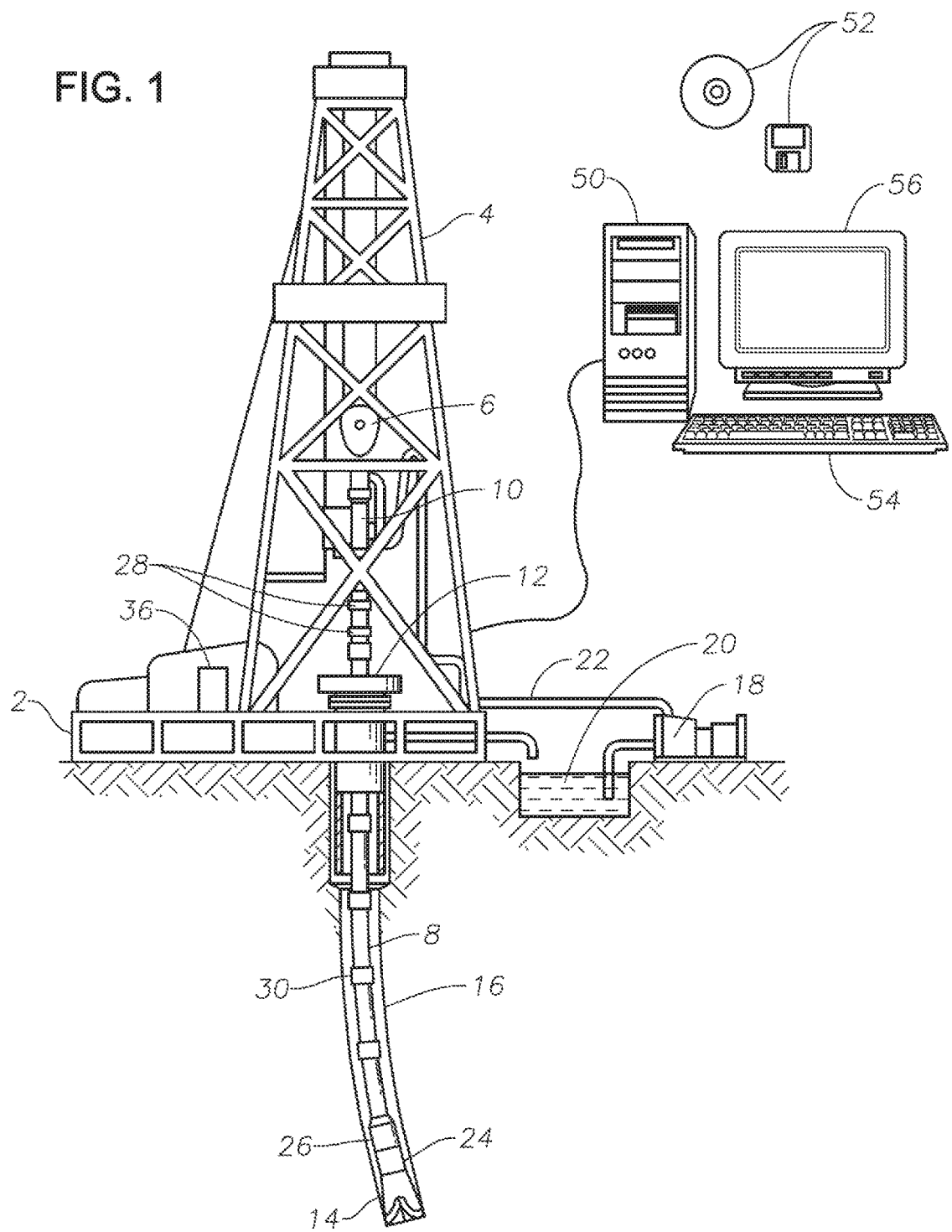
FIG. 1 shows an illustrative LWD environment in which an acoustic measurement tool is deployed in a drilling application, according to an illustrative embodiment of the present disclosure.

Illustrative embodiments and related methods of the present disclosure are described below as they might be employed in adjustable acoustic transducer (transmitters and/or receivers) fittings that provide improved acoustic/sonic signal strength. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, embodiments and related methods of the present disclosure are directed to movable transducer (transmitter and/or receiver) designs used in downhole environments to increase the efficiency of the transmitter and receivers, thereby obtaining improved logging data. In a first generalized embodiment, a downhole acoustic measurement tool includes a tool housing having a transmitter port. A rotatable acoustic transmitter is positioned within the transmitter port. An actuation mechanism is connected to the transmitter to rotate it to a desired angle and/or to extend the transmitter closer to the formation or retract it from the formation.

In a method using the first generalized embodiment, an adaptive algorithm is applied to rotate the transmitter to match the critical angle when the formation slowness changes. Here, the tool is deployed downhole with the transmitter positioned at a first angle. A first acoustic wave is generated by the transmitter and propagated into the wellbore. The first acoustic wave is measured to generate a first signal. The transmitter is then rotated to a second angle based upon the first signal, the second angle being the critical angle in which the strongest pressure wave may be directed for increasing signal strength at the receiver. Also, the transmitter may be extended outwardly toward the formation or retracted inwardly to increase or reduce the strength of the propagated acoustic wave. This process may be repeated iteratively to continually optimize the signal strength at the receiver.

In a second generalized embodiment, the transmitter port along the tool housing has a cone-shaped exterior profile designed to match the impedances of the acoustic waves with the surrounding wellbore environment. In a third generalized embodiment, the transmitter port is positioned at a fixed angle before the tool is deployed downhole. As a result in all embodiments, the acoustic waves will have improved energy.

The disclosed movable acoustic transmitter/receiver fittings and related methods are best understood in the context of larger systems in which they may operate. Accordingly, FIG. 1 shows an illustrative logging-while-drilling ("LWD") environment in which an acoustic measurement tool (e.g., logging tool) is deployed. A drilling platform 2 supports a derrick 4 having a traveling block 6 for raising and lowering a drill string 8. A top drive 10 supports and rotates drill string 8 as it is lowered through wellhead 12. A drill bit 14 is driven by a downhole motor and/or rotation of drill string 8. As bit 14 rotates, it creates a borehole 16 that passes through various formations. A pump 18 circulates drilling fluid 20 through a feed pipe 22, through the interior of drill string 8 to drill bit 14. The fluid exits through orifices in drill bit 14 and flows upward through the annulus around drill string 8 to transport drill cuttings to the surface, where the fluid is filtered and recirculated.

Drill bit 14 is just one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

An acoustic measurement tool 24 is integrated into the bottom-hole assembly near bit 14. As bit 14 extends the borehole through the formations, acoustic measurement tool 24 rotates and collects azimuthally-dependent reflection measurements that a downhole controller associates with tool position and orientation measurements. The measurements can be stored in internal memory and/or communicated to the surface. A telemetry sub 26 may be included in the bottom-hole assembly to maintain a communications link with the surface. Mud pulse telemetry is one common telemetry technique for transferring tool measurements to surface receivers and receiving commands from the surface, but other telemetry techniques can also be used.

At the surface, a data acquisition module 36 receives the uplink signal from the telemetry sub 26. Module 36 optionally provides some preliminary processing and digitizes the signal. A data processing system 50 (shown in FIG. 1 as a computer) receives a digital telemetry signal, demodulates the signal, and displays the tool data or well logs to a user. Software (represented in FIG. 1 as information storage media 52) governs the operation of system 50. A user interacts with system 50 and its software 52 via one or more input devices 54 and one or more output devices 56. In alternate embodiments, the data processing system may be located along the bottom hole assembly (and/or at least partially at a remote location such as on the surface, further up the borehole, or at a facility remote from the well site) where all the processing occurs, or a portion of the processing may occur downhole while the remainder occurs at a remote location (e.g., surface).

Figure 2:
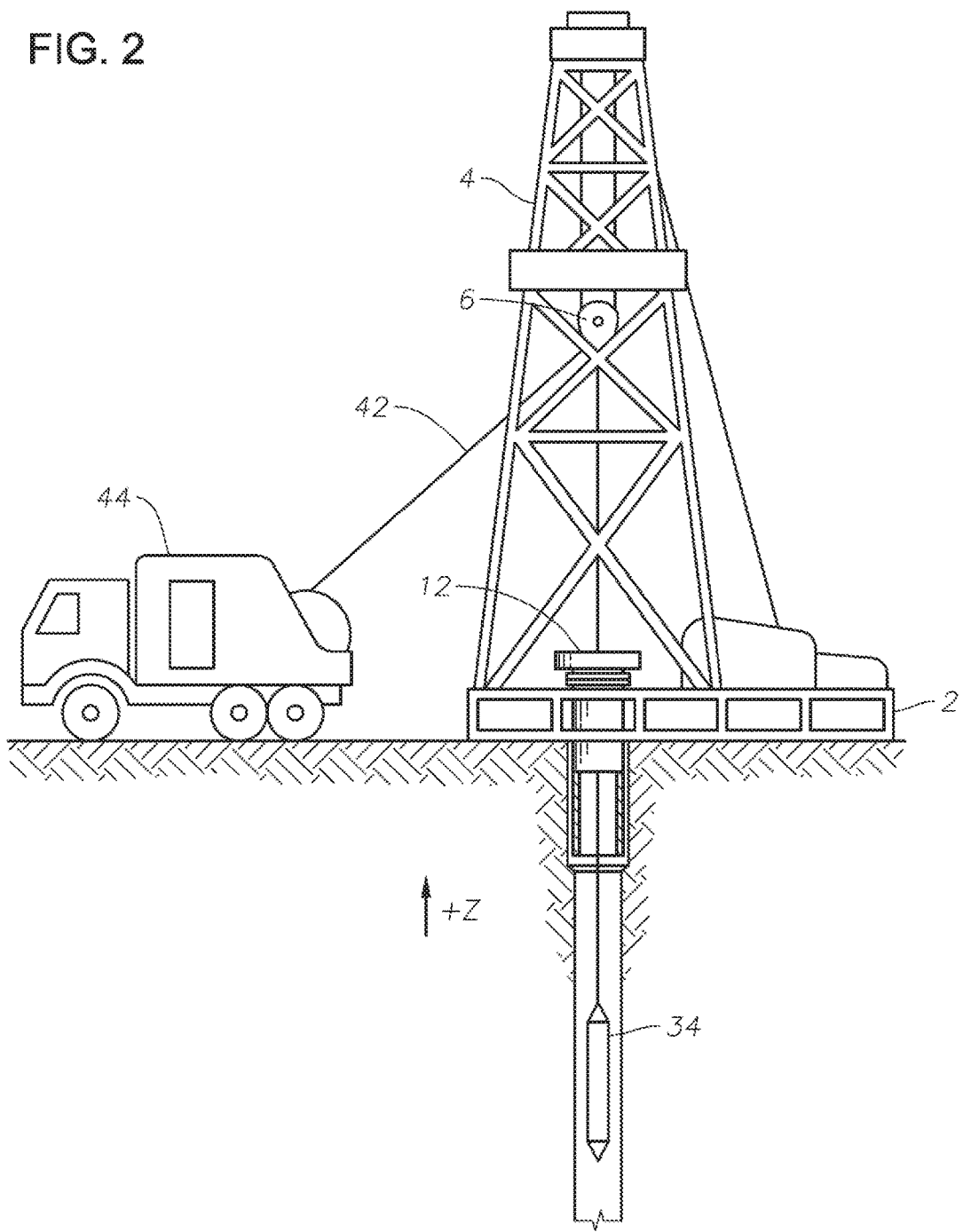
FIG. 2 shows an embodiment of the present disclosure deployed in a wireline application.

At various times during the drilling process, drill string 8 may be removed from the borehole as indicated in FIG. 2, which shows an embodiment of the present disclosure deployed in a wireline application. In such an embodiment, once drill string 8 has been removed, logging operations can be conducted using an acoustic measurement tool 34, i.e., a sensing instrument sonde suspended by a cable 42 having conductors for transporting power to the tool and telemetry from the tool to the surface. A logging facility 44 collects measurements from acoustic measurement tool 34, and includes computing facilities for processing and storing the measurements gathered by acoustic measurement tool 34. As mentioned above, at least a portion of the processing may be conducted downhole in alternate embodiments.

Figure 3A:
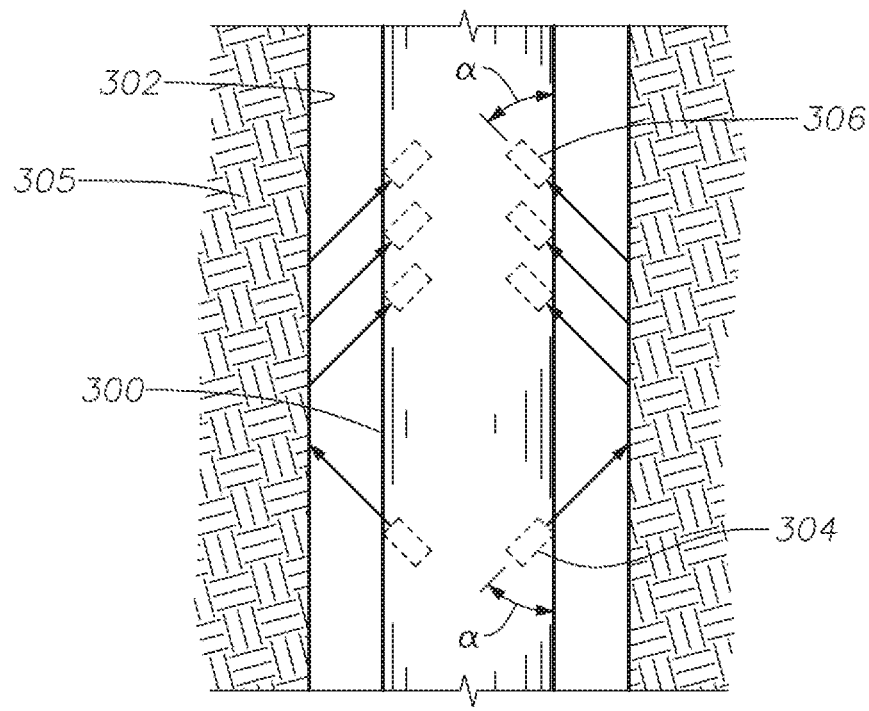
FIG. 3A illustrates a downhole acoustic measurement tool according to an illustrative embodiment of the present disclosure.
Figure 3B:
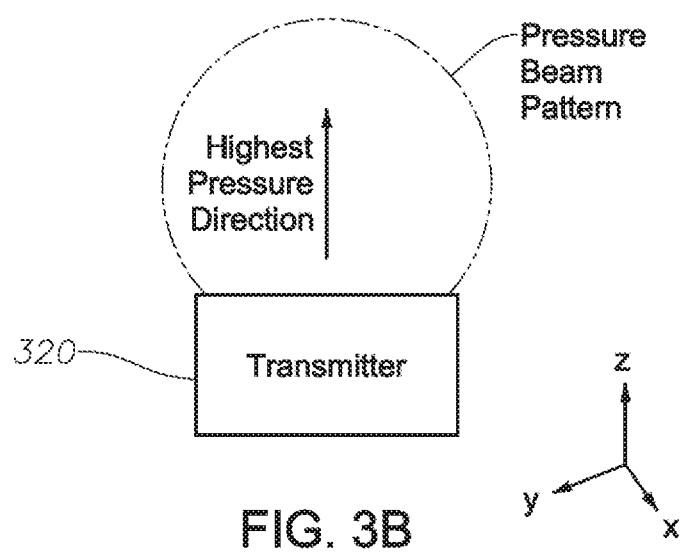
FIG. 3B is a block diagrammatical illustration of a transmitter for illustration purposes.

FIG. 3A illustrates a downhole acoustic measurement tool according to an illustrative embodiment of the present disclosure. Downhole acoustic measurement tool 300 has been deployed into wellbore 302 which extends into formation 305. In this example, downhole acoustic measurement tool 300 includes at least one acoustic transmitter 304 and at least one acoustic receiver 306. FIG. 3B is a block diagrammatical illustration of a transmitter 320 for illustration purposes. As seen in FIG. 3B, the pressure generated by transmitter 320 is strongest in the vertical direction. In the illustrative embodiments described herein, in order to direct more energy into formation 305 through the critical angle, the transmitter is tilted by an angle, a, with respect to the axial orientation of the tool, which could be calculated based on, for example, Snell's law (FIG. 3A). From the range of mud density and the range of slowness of the formation, Snell's law will provide the range of critical incident angle and refraction angle for the acoustic waves. By tilting the axis of transmitter(s) 304 and receiver(s) 306 to these critical angles, the direction of the strongest pressure wave will be the direction of the critical incident path, and thus the signal received at receiver(s) 306 will be improved.

Note also that receiver(s) 306 are positioned at angle α, except that they are angled in the opposite, or inverse, direction. In other words, in this example, receiver(s) 306 are positioned at an angle of 180 degrees minus the angle of transmitter(s) 304 with respect to the same tool axis direction. In other embodiments, however, the transmitter and receiver angles may differ due to a variety of situations, such as, for example, when the tool axis is misaligned with the borehole axis.

Figure 4:
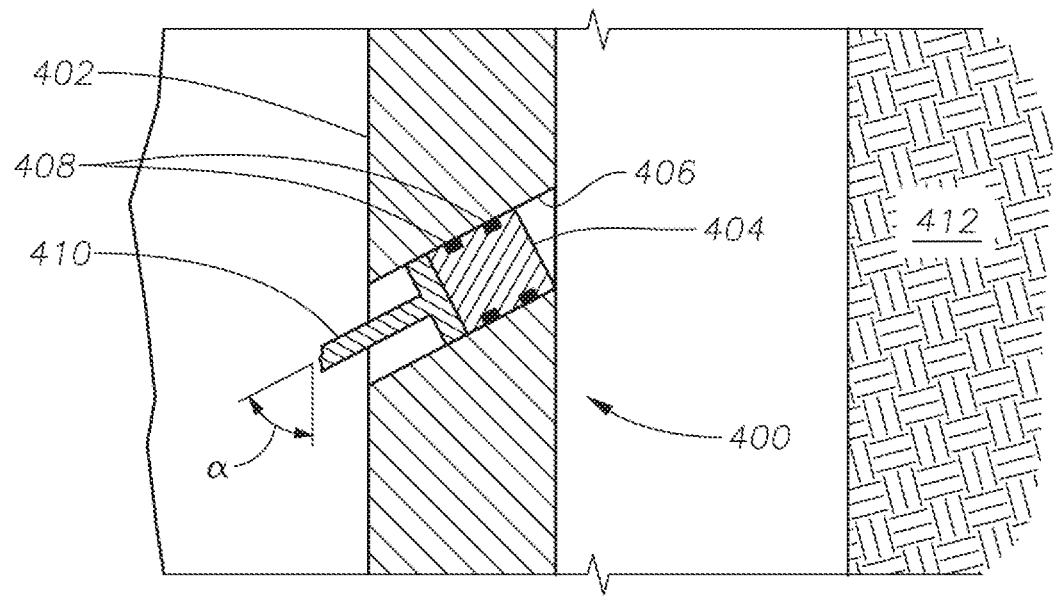
FIGS. 4 and 5 are sectional views of the housing of acoustic measurement tools, according to certain illustrative embodiments of the present disclosure.

FIG. 4 is a sectional view of the housing of an acoustic measurement tool, according to certain illustrative embodiments of the present disclosure. Here, acoustic measurement tool 400 has a tool housing 402 (e.g., collar) in which a transmitter port 406 is positioned. Transmitter port 406 extends through housing 402 at a fixed angle α, which was determined using Snell's law, as will be described below with reference to Equation 1. An acoustic transmitter 404 is positioned inside transmitter port 406 having one or more annular seals 408 positioned between transmitter 404 and port 406 to prevent the influx of wellbore fluid from entering acoustic measurement tool 400. Acoustic transmitter 404 is connected to an actuation mechanism 410 which is adapted to extend acoustic transmitter 404 outwardly toward formation 412, or to retract acoustic transmitter 404 inwardly from formation 412.

Although not shown, actuation mechanism 410 may be actuated using any variety of actuators, such as, for example, a piston controlled by on-board processing circuitry or remote circuitry. As a result of this outward/inward movement, acoustic transmitter 404 will transfer more energy to formation 412, and the resultant signal strength at the receiver (not shown) will be higher. For example, following the inverse square law, when the transmitter moves near to the formation in such a way that its distance is reduced by half, the acoustics received at the formation (and thus the receiver) are four times higher. In a similar way, if the distance between the receiver and the formation is reduced by half, the received energy at the receiver is also four times higher. Such an embodiment is also useful if the borehole size is large. In addition, although not shown, transmitter 404 is connected to processing circuitry via suitable wired or wireless means.

Figure 5:
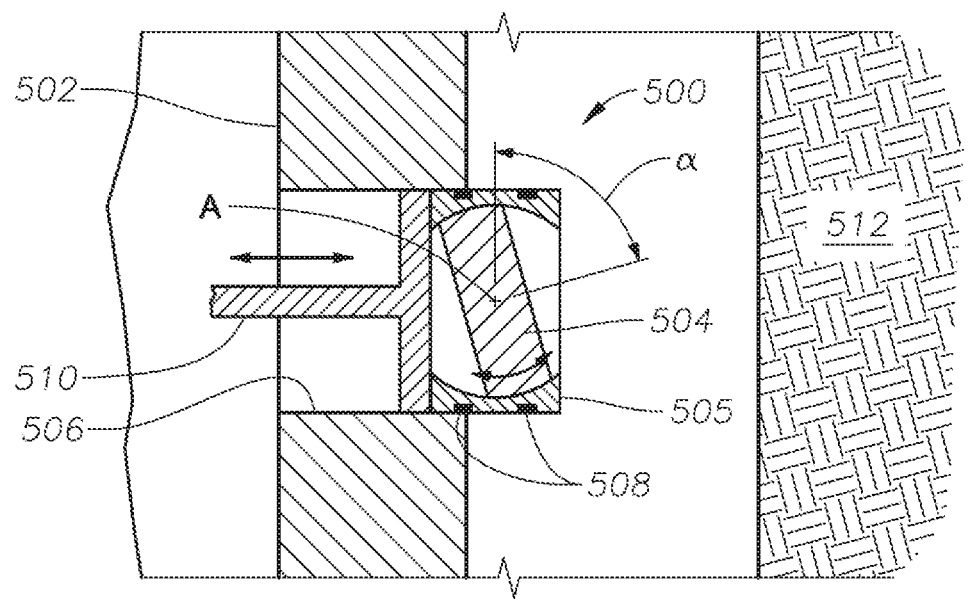

FIG. 5 is a sectional view of the housing of an acoustic measurement tool, according to certain illustrative embodiments of the present disclosure. Here, acoustic measurement tool 500 has a tool housing 502 (e.g., collar) in which a transmitter port 506 is positioned. Unlike port 406, transmitter port 506 extends through housing 502 at an angle which is perpendicular to the axis of tool 500. However, to achieve the desired angle α, acoustic transmitter 504 is rotatable about an axis A. Acoustic transmitter 504 is positioned inside a curved-shaped holder 505, which is connected to actuation mechanism 510 as previously described. Additionally, a second actuation mechanism (not shown) is connected to acoustic transmitter 504 at axis A to thereby rotate transmitter 504 to the desired angle. One or more annular seals 508 are positioned around holder 504 to provide a seal along transmitter port 506. Both actuation mechanisms (510, the one connected at axis A) are connected to processing circuitry to extend, retract and rotate acoustic transmitter 504 in order to provide the necessary acoustic energy to formation 512. Although not shown, the receiver would be designed as the transmitter (i.e., moveable and rotatable), except that the receiver would likely be rotated in the opposite direction (as shown in FIG. 3A). Note also, in an alternative embodiment, transmitter port 506 (and the receiver port) may extend through housing 502 at a fixed angle α also determined using Snell's law, as will be described below with reference to Equation 1.

Figure 6:
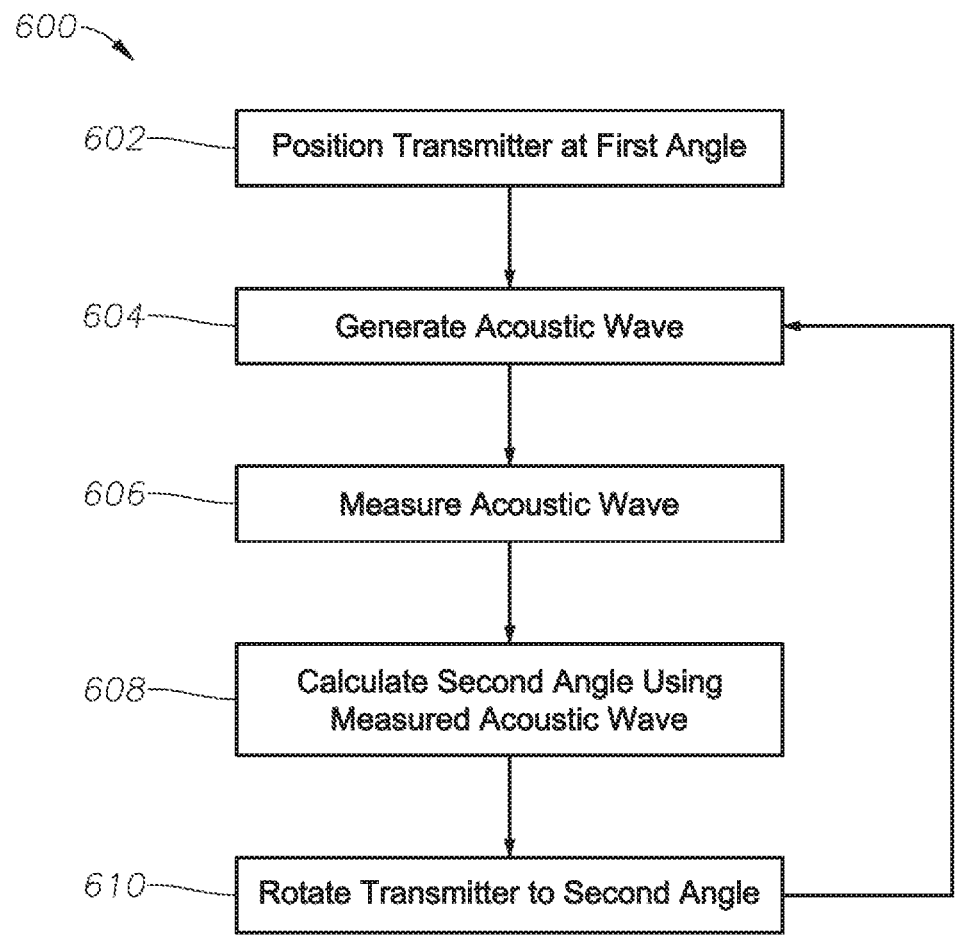
FIG. 6 is a flow chart of a method for acquiring a downhole acoustic measurement, according to an illustrative method of the present disclosure.

FIG. 6 is a flow chart of a method for acquiring a downhole acoustic measurement, according to an illustrative method of the present disclosure. In this method, an acoustic measurement tool such as that described in FIGS. 3A and 5 is utilized. After the acoustic measurement tool is deployed into the wellbore, the transmitter is positioned at a first angle α, such as, for example, 90°, at block 602. At block 604, the transmitter is operated to generate a preset acoustics wave at block 604 which, in this example, was determined before the tool was deployed. Here the preset acoustics wave may be a chirp or a sweep signal of which the frequencies are near the resonant frequency of the transmitter for higher acoustics output. The generated acoustic wave propagates through the formation and is eventually received by the receiver. The received waveform is then measured/analyzed at block 606 to obtain the velocity of the formation (compressional wave $V_p$, shear wave $V_s$). $V_{mud}$ is assumed to be available, as it can be obtained by another acoustics transducer on the tool.

With the formation velocities obtained from block 606, the critical angle (i.e., second angle α in which the acoustic wave is critically refracted along the borehole surface) is calculated at block 608. The critical angle is defined as the incident angle that the refracted acoustic wave travels along the borehole wall before it is detected by the receivers. In this example, the following equation may be utilized:

$$\alpha=90°-\arcsin(V_{mud}/V_{formation}) \quad \text{Eq.(1)}.$$

The transmitter is then rotated at block 610 to match this angle α so that more acoustic energy is transferred through the critical path and thus the logging data will be clearer and more accurate. The method then loops back to block 604 where the acoustic wave is generated, and measured again at block 606. After the new velocities are obtained, another tilted angle α is determined at block 608 and the process is repeated throughout the logging process. Accordingly, the method allows adaptive control of the signal quality as the tool moves along the well to other formation types and the formation slowness changes. As a result, the highest energy will be transferred into the formation regardless of the formation variation.

Also, in this method, as the acoustic transmitter is rotated, the receivers are also rotated to the same angle except in the opposite direction (as shown in FIG. 3A). Moreover, in certain methods, the transmitter/receivers are also extended outwardly or retracted inwardly to effect the force of the acoustic wave propagated toward the formation.

Note that Equation 1 is applied in instances when the tool axis is parallel to the borehole axis. However, in certain illustrative methods when the tool axis is misaligned with the borehole axis, angle α for the transmitter(s) and receiver(s) may be defined as:

$$\alpha'=90°-\arcsin(V_{mud}/V_{formation})-\Theta \quad \text{Eq.(2)},$$

where α' is the critical angle of the receiver(s) and $\Theta$ is the misalignment angle between the tool axis and borehole axis, and:

$$\alpha''=90°-\arcsin(V_{mud}/V_{formation})+\Theta \quad \text{Eq.(3)},$$

where α" is the critical angle of the transmitter(s). Note that Equations 2 and 3 represent the situation in which the tool is misaligned such that the transmitter is closer to the borehole wall than the receiver. However, in those instances in which the reverse is true, the Equations will be reversed as well.

Figure 7A:
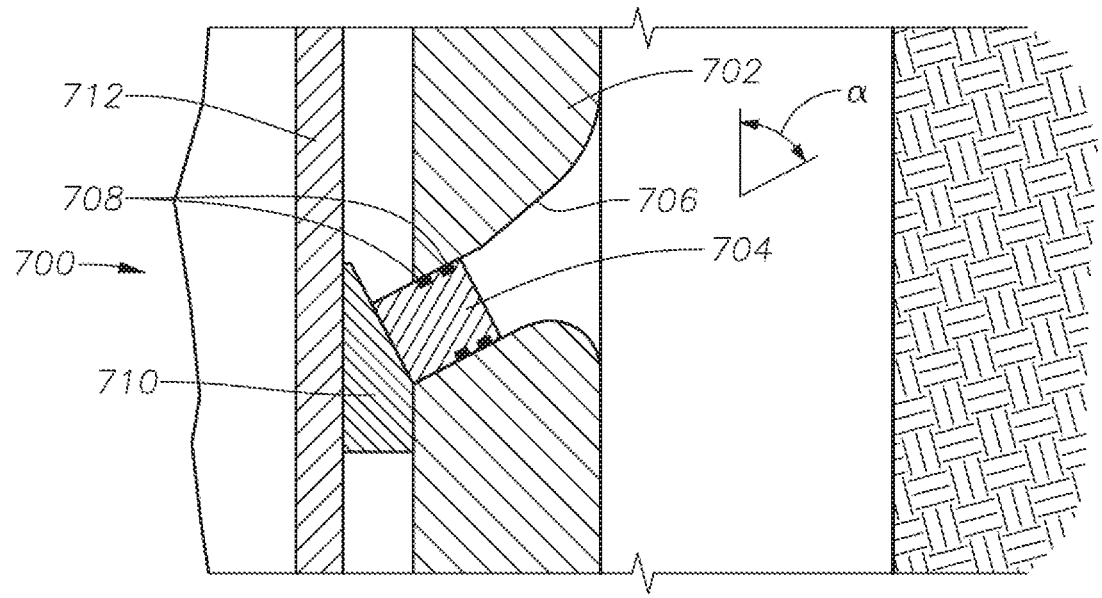
FIGS. 7A-B and 8A-B are sectional views of the housing of acoustic measurement tools, according to certain illustrative embodiments of the present disclosure.

FIG. 7A is a sectional view of the housing of yet another acoustic measurement tool, according to certain illustrative embodiments of the present disclosure. Here, acoustic measurement tool 700 has a tool housing 702 (e.g., collar) in which a transmitter port 706 is positioned. Transmitter port 706 is fixed and extends through housing 402 at an angle α, as previously described. An acoustic transmitter 704 is positioned inside transmitter port 706 having one or more annular seals 708 positioned between transmitter 704 and port 706 to prevent the influx of wellbore fluid from entering acoustic measurement tool 700. As previously described, although not shown, transmitter 704 will be connected to processing circuitry via suitable wired or wireless means. Transmitter 704 is connected to a base 710 which is connected to an electronics insert 712 (i.e., processing circuitry). Note that these pieces may be a single piece and may be utilized in any of the embodiments described herein.

In this embodiment, transmitter port 706 has a coned-shaped exterior profile designed to match the impedance of the acoustic waves to the surrounding environment (e.g., drilling mud in wellbore). When the wavelengths of the sound waves are smaller than the size of the cavity holding the waves (in this case, the inside of port 706), the reflection is dependent on the impedance per area (Z) inside port 706. Consider the following equation:

$$Z=Z_o/A \quad \text{Eq.(4)},$$

in which $Z_o$ is the specific impedance of the medium (e.g, drilling mud) and A is the cross section area of port 706. If the transmitter port changes in cross-sectional area slowly from one end to another as the wave propagates along, it acts as an impedance transformer. The more gradual change in the cone diameter helps couple the sound to the surrounding environment. As a result, more acoustic energy will be radiated, thereby increasing the strength of the signal.

Figure 7B:
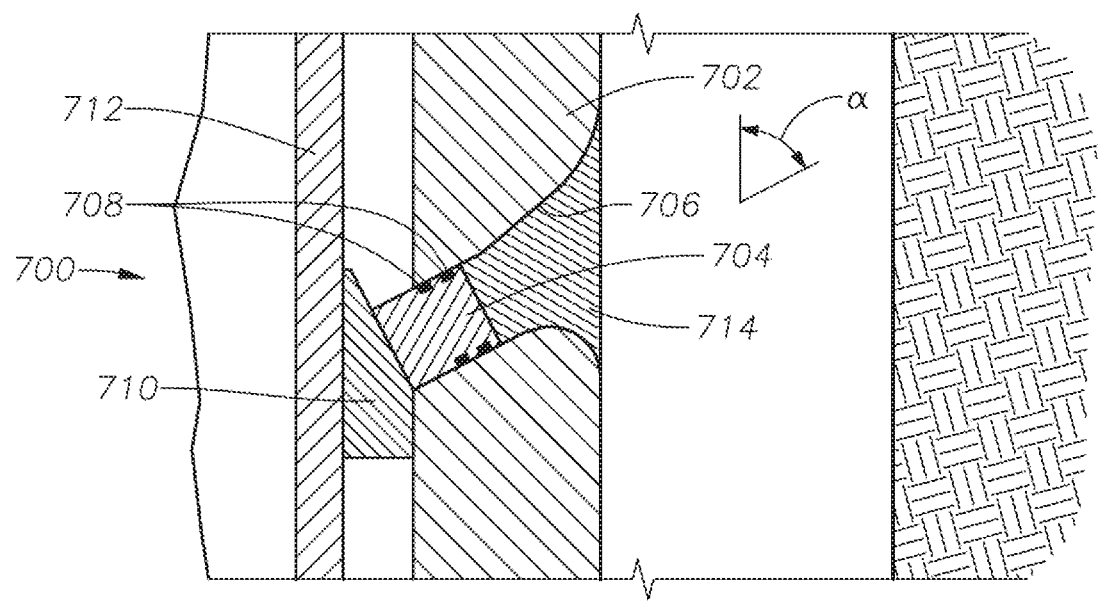
Figure 8A:
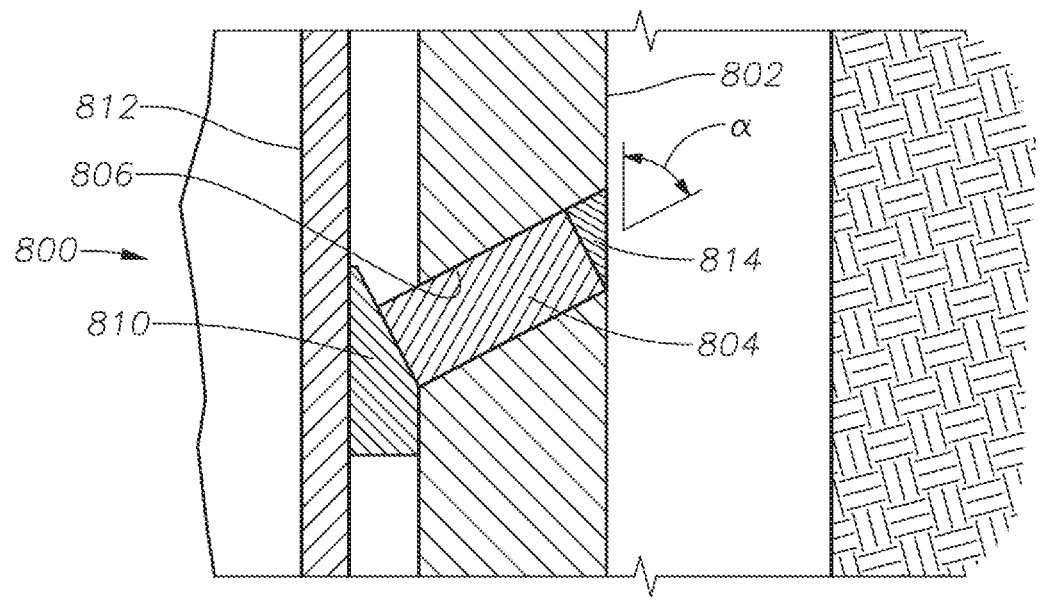
Figure 8B:
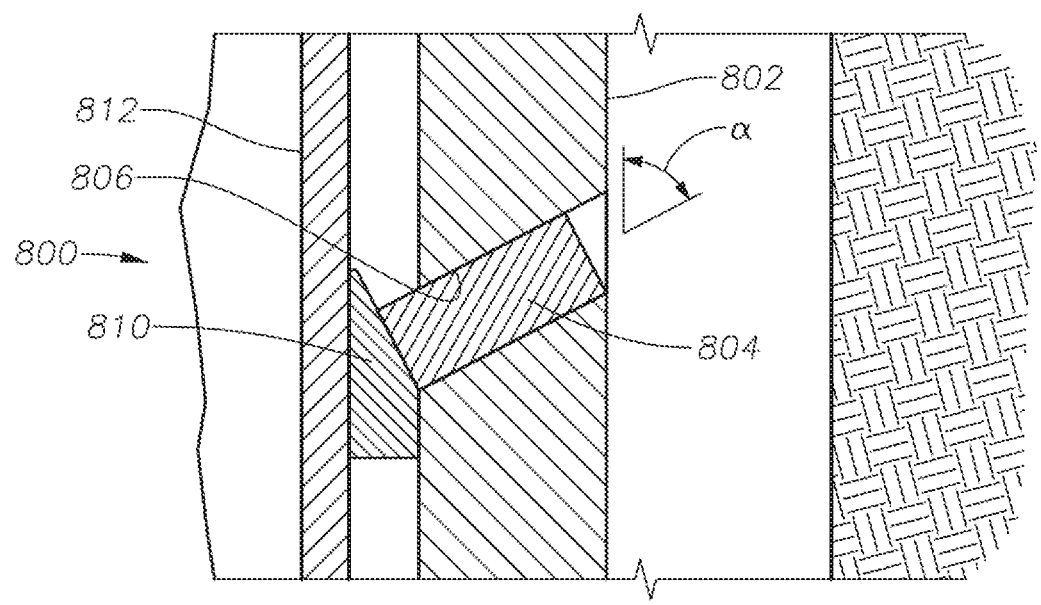

FIG. 8A illustrates yet another embodiment of an acoustic measurement tool, according to certain embodiments of the present disclosure. Here, acoustic measurement tool 800 has a tool housing 802 (e.g., collar) in which a transmitter port 806 is positioned. Transmitter port 806 is fixed and extends through housing 802 at an angle α, as previously described. An acoustic transmitter 804 is positioned inside transmitter port 806. In this illustration, transmitter 804 is connected to a base 810 which is connected to an electronics insert 812 (i.e., processing circuitry). Note that these pieces may be a single piece and may be utilized in any of the embodiments described herein. Moreover, in this embodiment, an acoustically transparent cap 814 is positioned over the opening of transmitter port 806 to prevent wellbore fluid from entering port 806. Cap 814 may be made of, for example, Polyketones. Since cap 814 fills the remainder of transmitter port 806, the fluid flow across tool housing 802 is smoother thereby reducing turbulence. As a result, the erosion of tool housing 802 is also reduced. Furthermore, cap 814 may be utilized in one or more of the other embodiments described herein, such as the embodiment shown in FIG. 7B, whereby cap 714 is positioned inside cone-shaped port 706. Moreover, in an alternative embodiment, acoustic measurement tool 800 may be utilized without cap 814, as shown in FIG. 8B.

Embodiments and methods described herein further relate to any one or more of the following paragraphs:

1. A method for acquiring a downhole acoustic measurement, the method comprising deploying a downhole tool into a wellbore extending along a formation, the downhole tool having an acoustic transmitter and receiver; using the acoustic transmitter, generating a first acoustic wave at a first angle with respect to an axis of the downhole tool, thereby causing the first acoustic wave to propagate into the wellbore; and receiving the first acoustic wave using the receiver.

2. A method as defined in paragraph 1, wherein deploying the downhole tool comprises positioning the acoustic transmitter at the first angle; receiving the first acoustic wave comprises measuring the first acoustic wave to thereby generate a first signal; and the method further comprises: rotating the acoustic transmitter to a second angle based upon the first signal; using the acoustic transmitter, generating a second acoustic wave at the second angle, thereby causing the second acoustic wave to propagate into the wellbore; and measuring the second acoustic wave to thereby generate a second signal.

3. A method as defined in paragraphs 1 or 2, further comprising rotating the acoustic receiver to a third angle, wherein the third angle is 180 degrees minus the second angle with respect to the axis.

4. A method as defined in any of paragraphs 1-3, wherein the first angle is a preset angle determined before the downhole tool is deployed into the wellbore; and the second angle is determined while the downhole tool is in the wellbore.

5. A method as defined in any of paragraphs 1-4, wherein measuring the first acoustic wave comprises calculating a velocity of the formation.

6. A method as defined in any of paragraphs 1-5, further comprising calculating a critical angle of the first acoustic wave using the velocity of the formation.

7. A method as defined in any of paragraphs 1-6, wherein rotating the acoustic transmitter to the second angle comprises rotating the acoustic transmitter to the critical angle.

8. A method as defined in any of paragraphs 1-7, wherein rotating the acoustic transmitter comprises extending the acoustic transmitter nearer to the formation.

9. A method as defined in any of paragraphs 1-8, wherein the downhole tool is deployed along a logging or drilling assembly.

10. A downhole acoustic measurement tool, comprising a tool housing having a transmitter port and a receiver port; an acoustic transmitter positioned within the transmitter port, the acoustic transmitter being configured to generate an acoustic wave at an angle with respect to an axis of the tool; and an acoustic receiver positioned inside the receiver port to receive the acoustic wave.

11. A tool as defined in paragraph 10, further comprising a first actuation mechanism to rotate the acoustic transmitter to a desired angle with respect to the axis of the tool; and a second actuation mechanism to extend the acoustic transmitter outside the transmitter port or to retract the acoustic transmitter inside the transmitter port.

12. A tool as defined in paragraphs 10 or 11, further comprising a third actuation mechanism to rotate the acoustic receiver to a desired angle with respect to the axis of the tool; and a fourth actuation mechanism to extend the acoustic receiver outside the receiver port or to retract the acoustic receiver inside the receiver port.

13. A tool as defined in any of paragraphs 10-12, wherein the acoustic transmitter is housed inside a curved-shaped holder; and the tool further comprises an annular seal positioned between the transmitter port and the holder.

14. A tool as defined in any of paragraphs 10-13, wherein the tool forms part of a logging or drilling assembly.

15. A tool as defined in any of paragraphs 10-14, wherein the transmitter port comprises a cone-shaped exterior profile.

16. A tool as defined in any of paragraphs 10-15, wherein a curvature of the cone-shaped profile matches an impedance of a generated acoustic wave to an impedance of a fluid present in a wellbore.

17. A tool as defined in any of paragraphs 10-16, wherein the receiver port comprises a cone-shaped exterior profile.

18. A tool as defined in any of paragraphs 10-17, wherein the transmitter and receiver ports are oriented at a same angle, but in opposite directions, with respect to the axis of the tool.

19. A tool as defined in any of paragraphs 10-18, further comprising an annular seal between the acoustic transmitter and the transmitter port.

20. A tool as defined in any of paragraphs 10-19, further comprising an acoustically transparent cap positioned in the transmitter or receiver port.

21. A tool as defined in any of paragraphs 10-20, further comprising an acoustically transparent cap positioned in the cone-shaped exterior profile.

22. A tool as defined in any of paragraphs 10-21, wherein the tool forms part of a logging or drilling assembly.

23. A method comprising disposing into a wellbore an acoustic measurement tool as defined in any one of paragraphs 10-22; and acquiring a downhole acoustic measurement using the acoustic measurement tool.

24. A method for designing a transducer port for use in a downhole acoustic measurement tool, the method comprising designing a tool housing for the acoustic measurement tool, the tool housing containing a transducer; and designing a transducer port to house the transducer which generates acoustic waves, the transducer port being designed to match an impedance of the acoustic waves with an environment surrounding the acoustic measurement tool.

25. A method as defined in paragraph 24, wherein designing the transducer port to match the impedance comprises designing the transducer port such that an inner diameter of the transmitter port gradually expands away from the transducer and toward the environment, thereby forming a cone-shaped profile.

26. A method as defined in paragraphs 24 or 25, further comprising fabricating the acoustic measurement tool.

Although various embodiments and methodologies have been shown and described, the disclosure is not limited to such embodiments and methodologies and will be understood to include all modifications and variations as would be apparent to one skilled in the art. For example, any of the designs described herein for transmitters, may be applied to receiver fittings as well. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A method for acquiring a downhole acoustic measurement, the method comprising:
    deploying a downhole tool into a wellbore extending along a formation, the downhole tool having an acoustic transmitter positioned inside a transmitter port and an acoustic receiver, the transmitter port having a first opening and a second opening opposite the first opening;
    using the acoustic transmitter, generating a first acoustic wave at a first angle with respect to a longitudinal axis of the downhole tool, thereby causing the first acoustic wave to propagate into the wellbore;
    receiving the first acoustic wave using the receiver to thereby generate a first signal;
    rotating the acoustic transmitter to a second angle with respect to a plane parallel to the longitudinal axis of the downhole tool based upon the first signal,
    wherein the plane is also parallel to an axis of the transmitter port, the axis of the transmitter port extending between the first and second openings of the transmitter port;
    using the acoustic transmitter, generating a second acoustic wave at the second angle, thereby causing the second acoustic wave to propagate into the wellbore; and
    measuring the second acoustic wave to thereby generate a second signal.

2. The method as defined in claim 1, further comprising rotating the acoustic receiver to a third angle, wherein the third angle is 180 degrees minus the second angle with respect to the plane parallel to the longitudinal axis of the downhole tool.

3. The method as defined in claim 1, wherein:
    the first angle is a preset angle determined before the downhole tool is deployed into the wellbore; and
    the second angle is determined while the downhole tool is in the wellbore based upon the first signal.

4. The method as defined in claim 1, wherein generating the first signal comprises measuring the first acoustic wave; and
    wherein measuring the first acoustic wave comprises calculating a velocity of the formation.

5. The method as defined in claim 4, further comprising calculating a critical angle of the first acoustic wave using the velocity of the formation.

6. The method as defined in claim 5, wherein rotating the acoustic transmitter to the second angle comprises rotating the acoustic transmitter to the critical angle.

7. The method as defined in claim 1, wherein rotating the acoustic transmitter comprises extending the acoustic transmitter nearer to the formation.

8. The method as defined in claim 1, wherein the downhole tool is deployed along a logging or drilling assembly.

* * * * *